United States Patent
Liu et al.

(10) Patent No.: US 6,850,296 B2
(45) Date of Patent: Feb. 1, 2005

(54) COMPOSITE LIQUID CRYSTAL PANEL

(75) Inventors: He-Chiang Liu, Taoyuan (TW); Hsiao-Yi Li, Taoyuan (TW); Hung-Lung Cheng, Taoyuan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 9 days.

(21) Appl. No.: 10/419,779

(22) Filed: Apr. 22, 2003

(65) Prior Publication Data

US 2003/0206254 A1 Nov. 6, 2003

(30) Foreign Application Priority Data

May 3, 2002 (TW) .......................................... 91109208 A

(51) Int. Cl.[7] .......................... G02F 1/133; G02F 1/1335
(52) U.S. Cl. ........................... 349/113; 349/73; 216/23; 216/52
(58) Field of Search ..................... 349/113, 73; 216/23, 216/52, 53; 359/456, 457

(56) References Cited

U.S. PATENT DOCUMENTS

| | | | | | |
|---|---|---|---|---|---|
| 5,812,226 A | * | 9/1998 | Izumi et al. | ................... | 349/73 |
| 5,851,411 A | * | 12/1998 | An et al. | ...................... | 216/23 |
| 5,956,108 A | * | 9/1999 | Izumi et al. | ................... | 349/73 |

* cited by examiner

*Primary Examiner*—Huyen Ngo
(74) *Attorney, Agent, or Firm*—Rabin & Berdo, P.C.

(57) ABSTRACT

A composite liquid crystal panel includes a plurality of liquid crystal panels and a picture display surface. It cuts the border of each liquid crystal panel to a width of only one pixel, then bonding the panels together, installing the picture display surface on the liquid crystal panel, and distributing a portion of light from the normal pixels adjoining the border to the pixels corresponding to the border to resolve the gap problem. Light distribution is accomplished by using a pair of mirrors and a pair of reflecting surfaces to reflect the light of the pixels, so that light may be reflected above the pixels on the border and generate light. Then the pixels on the border and the pixels adjoining the border are redefined to form an image dot. Finally, through redistributing the light, the seams on the border may be completely eliminated.

8 Claims, 5 Drawing Sheets

COMPOSITE LIQUID CRYSTAL PANEL

FIELD OF THE INVENTION

The invention relates to a liquid crystal panel and particularly a composite liquid crystal panel.

BACKGROUND OF THE INVENTION

Three common used TV display systems today are cathode ray tubes (CRT), rear projection, and plasma display panels (PDP). Conventional TVs and full flat TVs adopt the CRT technology. Although the mature CRT technology has the advantages of low price, some shortcomings such as smaller display dimensions, excessive thickness, and high radiation still exit. The rear projection and PDP TV display systems overcome the high radiation by CRT, however, the rear projection TV set has a higher price. While it is not as thick as the CRT TV set for the same size of display picture, it still has a substantial thickness. The thin PDP TV set is very with high price, on the other hand, does not popularize the PDP TV sets.

In recent years the composite liquid crystal panel has become a direction many vendors are pursuing in the research of large sized liquid crystal panels. For instance, the Clarity corporation and the Pioneer corporation have introduced composite liquid crystal panels that consist of liquid crystal panels. However, on handling the seam, they still have problems. Specifically, there is a gap on the seam, which becomes an eye-sore of the whole liquid crystal screen. Hence the gap is a major bottleneck in the development of the liquid crystal panel at present.

In view of the aforesaid issues, the liquid crystal display panel (LCD panel) is used as the TV set panel. The well-developed and lower priced panels of smaller dimensions are not large enough for TV set, while the technology of larger dimension LCD panel is still not well developed and very expansive. For the display systems of smaller size (30 inches or smaller), there is a growing trend to use the LCD panel to replace the CRT display system. Thus, how to employ the existing and well-developed technologies of the LCD panel to produce a larger sized panel is a highly focused research issue.

SUMMARY OF THE INVENTION

In view of the aforesaid problems in the conventional techniques, the object of the invention is to provide a composite liquid crystal panel and its manufacturing method. The invention employs LCD panels of a smaller size that can be made at lower prices with mature technologies currently available, and a composite technique to produce LCD TVs that have a larger size, reduced thickness and lower price. Once the technology for the large size LCD panel is well developed in the future, the composite technique disclosed in the invention may be used to produce the LCD TV of even greater size.

The composite liquid crystal panel made according to the technique provided by the invention includes two or more liquid crystal panels and a picture display surface. Each of the liquid crystal panels has a border for joining to form the composite liquid crystal panel of the invention. The display pixels corresponding to the border do not have pixel light sources. The picture display surface is located above the composite liquid crystal panel to provide a light source for the picture. There is one or more reflecting surface located above the display pixel corresponding to the border of each liquid crystal panel. The corresponding normal display pixel adjoining the border has one or more mirror that has both penetrative and reflective functions. The mirror that has both penetrative and reflective functions allows a portion of light of the normal liquid crystal pixel to penetrate and reach the picture display surface, and another portion of light is reflected to the reflecting surface. The reflecting surface then reflects the light to the picture display surface.

In addition, the picture display surface may be plated with a layer of semi-reflective film. The plated film is on the pixels outside the border and outside the pixels adjoining the border so that illumination on the liquid crystal panel becomes more even. Or, a color filter may be bonded to the semi-reflection film and the picture display surface to fully mask the border.

In order to prevent the gap from forming on the border, the pixel is redefined. The pixels corresponding to the border of each liquid crystal panel and the adjoining normal pixels, i.e. p×p pixels, are defined as a new pixel, where p is an integer of 2 or more. Another method for resolving the gap phenomenon on the border is to use an electronic image control module to control the pixels defined for the border and to provide these defined pixels with twice as much illumination as other pixels.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
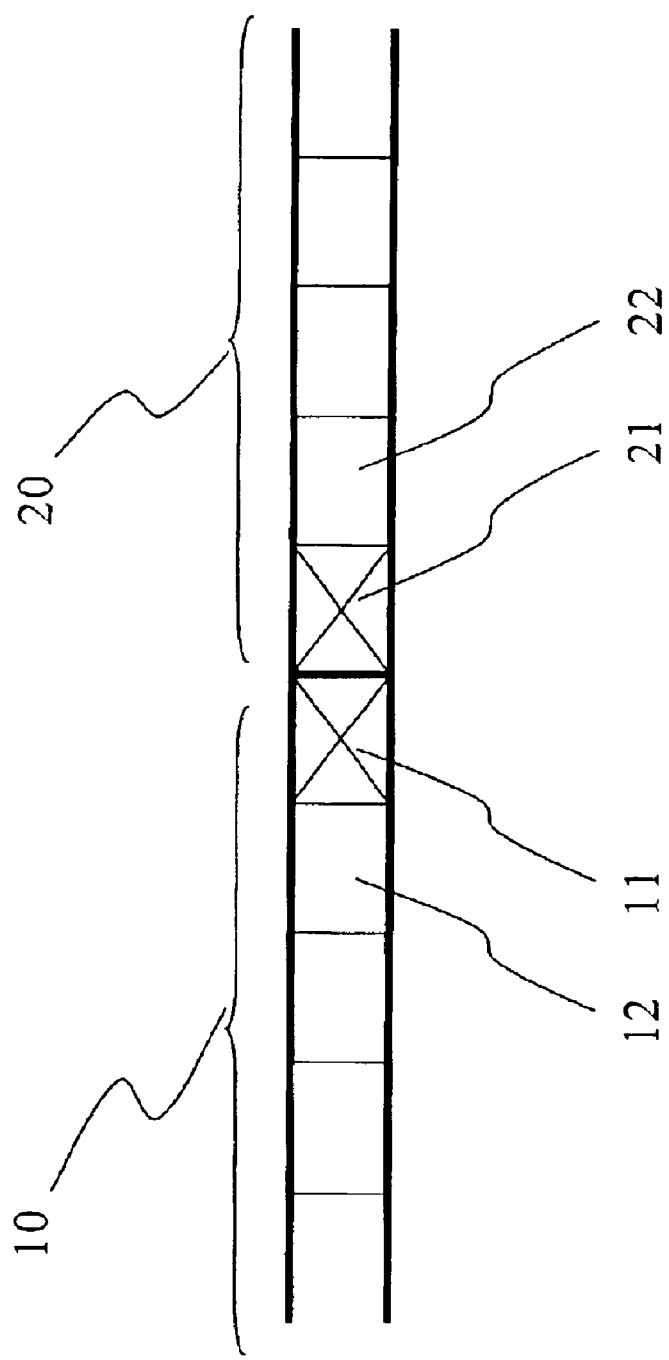
FIG. 1 is a schematic view of the liquid crystal panels of the invention laid in a juxtaposed manner.

Refer to FIG. 1 for the layout of the liquid crystal panel of the invention. The invention employs Thin Film Transistor Liquid Crystal Display panels (TFT-LCD panels). Each of the TFT-LCD panels has a border, which is cut to the width of only one pixel (including three dots of Red, Green and Blue). The pixel does not have a pixel light source.

A first liquid crystal panel 10 and a second liquid crystal panel 20 that have a border cut to the size of one pixel are joined in a juxtaposed manner to form a composite TFT-LCD panel double the size of the individual one. The first pixels 12 and 22 adjoining the border can display a picture normally. However, the pixels on the border 11 and 21 cannot display pictures in the normal manner. As a result, a gap of two pixels is formed on the displaying picture. As shown in FIG. 1, the formation of the gap is the problem to be overcome by the composite liquid crystal panel of the invention.

As the border of the liquid crystal panels has already been cut to the size of one pixel, resolving the problem caused by this one pixel can overcome the gap problem resulting from the absence of a light source. The invention provides a method to eliminate the gap phenomenon on the border. The method involves adding a picture display surface on the panel that can distribute light from the pixels adjoining the border, and can display a picture to the pixels on the border that cannot display the picture. Then the pixels corresponding to the border and the normal pixels adjoining the border can display the same picture. Such a method requires redefining the pixel. In other words, to alleviate the problem, the pixel corresponding to the border and the adjoining normal pixel that can display pictures are defined as one image dot.

Because light is redistributed, the resulting illumination is only one half of the original. Hence the illumination on the border is not adequate. The invention provides three approaches to resolve this problem. The first approach is using an electronic image control module to control the light source of the "image dot" on the border to make its illumination twice as strong than "other image dots". The second approach is using a half reflecting film to bond to the image dots on the non-border portion so that the image dots on the border have the same illumination as other image dots. The third approach is an extension of the second approach, but bonds a color filter to completely mask the border.

The method provided by the invention for eliminating the seam of the border on the composite liquid crystal panel includes the following steps: first, providing two or more liquid crystal panels, each with a border for bonding to each other to form a composite liquid crystal panel—the displaying pixels corresponding to the border do not have a pixel light source; next, providing a picture display surface above the composite liquid crystal panel to provide a light source for the picture—each display pixel corresponding to the border of the liquid crystal panel has one or more "reflecting surface" located thereabove, and the normal corresponding display pixel adjoining the border has one or more "mirror surface" with penetrative and reflective functions; then every pixel on the border and the normal display pixels adjoining the border are redefined as image dots, with p×p pixels defined as one image dot, where p is an integer of 2 or more, so that the light of the adjoining pixel is distributed to the pixel corresponding to the border, thereby eliminating the gap on the border.

Employing the methods mentioned above improve the illumination. The foregoing methods will be more clearly understood by referring to the following embodiments.

Figure 2:
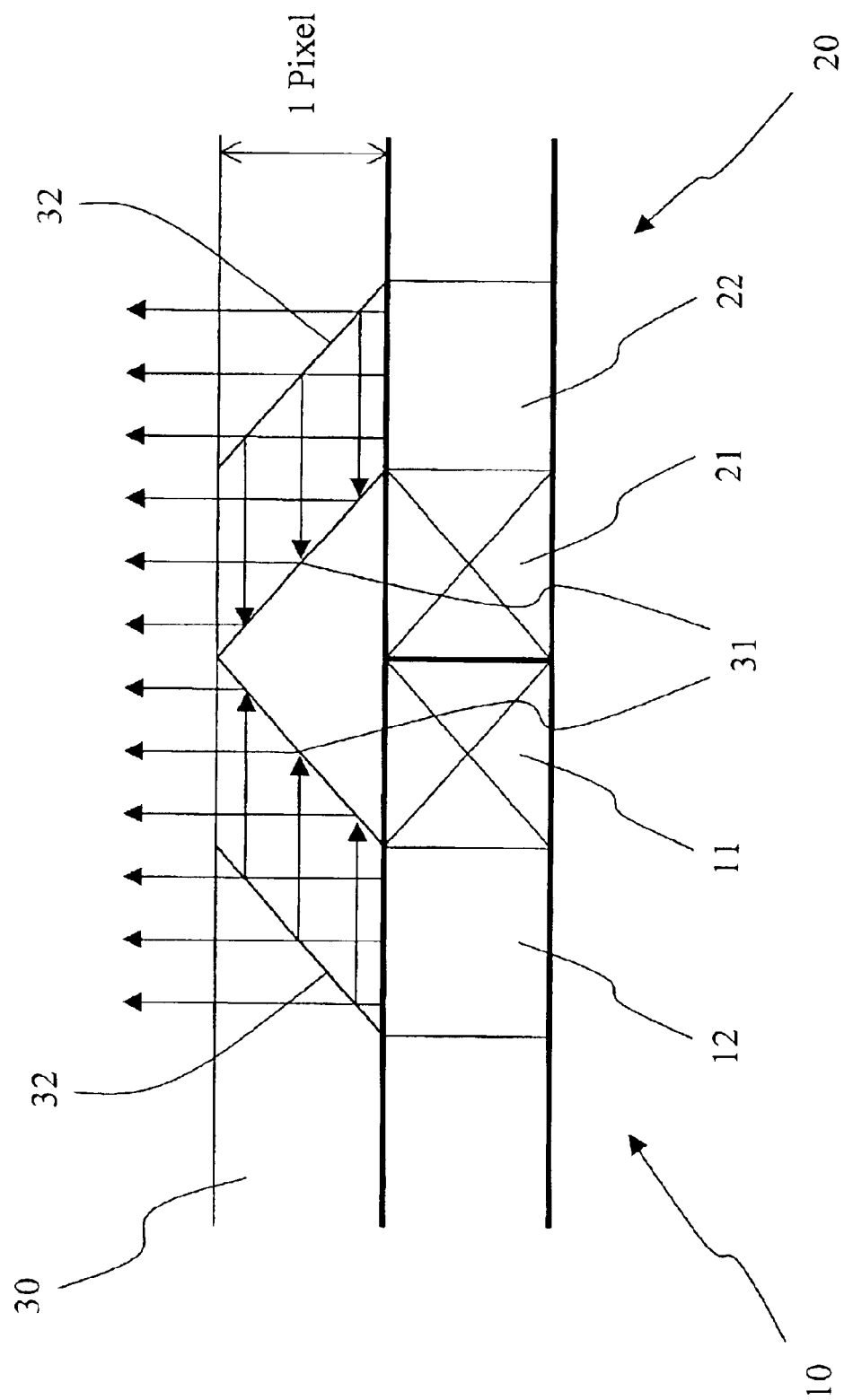
FIG. 2 is a schematic view of a first embodiment of the composite liquid crystal panel according to the invention.

Refer to FIG. 2 for a first embodiment of the composite liquid crystal panel of the invention. The thickness of the picture display surface is one pixel. The design of the picture display surface on the border, as shown in the drawing, includes: cutting diagonal surfaces of 45° and plating a semi-reflecting film 32 on one diagonal surface and a total reflecting film 31 on another diagonal surface (with a high reflecting metal film). The total reflecting film 31 is the actual application example of the "total reflecting surface" previously discussed. The semi-reflecting film 32 is the actual application example of the "mirror surface" that has penetrative and reflective functions previously discussed. The same is applied for the following embodiments. The total reflecting film 31 is formed in a right isosceles triangle with the bottom side covering pixels 11 and 21 on the border. I.e. the bottom side has a width of two pixels. The bottom of the semi-reflecting film 32 is spaced from the bottom of the total reflecting film 31 at a distance of one pixel. In order to allocate one half of the light of the first pixel 12 of the first liquid crystal panel 10 to the pixel 11 on the border (the same is applied to the first pixel 22 of the second liquid crystal panel 20 for allocating one half of the light to another pixel 12 on the border), the semi-reflecting film 32 and the total reflecting film 31 are formed at a 45° angle from the liquid crystal panel. In addition, the reflecting surface of the total reflecting film 31 is opposite to the liquid crystal panel to reflect the light from the semi-reflecting film 32 and to coincide with the direction of the original light beam.

Hence, when the light emitted from the first pixel 12 adjacent to the pixel 11 of the border projects on the surface of the semi-reflecting film 32, 50% of the light passes through while another 50% of the light is reflected. The light passing through continuously travels and passes through the picture display surface 30, while the reflected light reaches the total reflecting film 31 with a high reflective index and is almost totally reflected, then passes through the picture display surface. Similarly, the first pixel 22 adjacent to the pixel 21 of the border of the second liquid crystal panel behaves in the same way. Therefore, the gap of two pixels on the picture may be eliminated.

Figure 3:
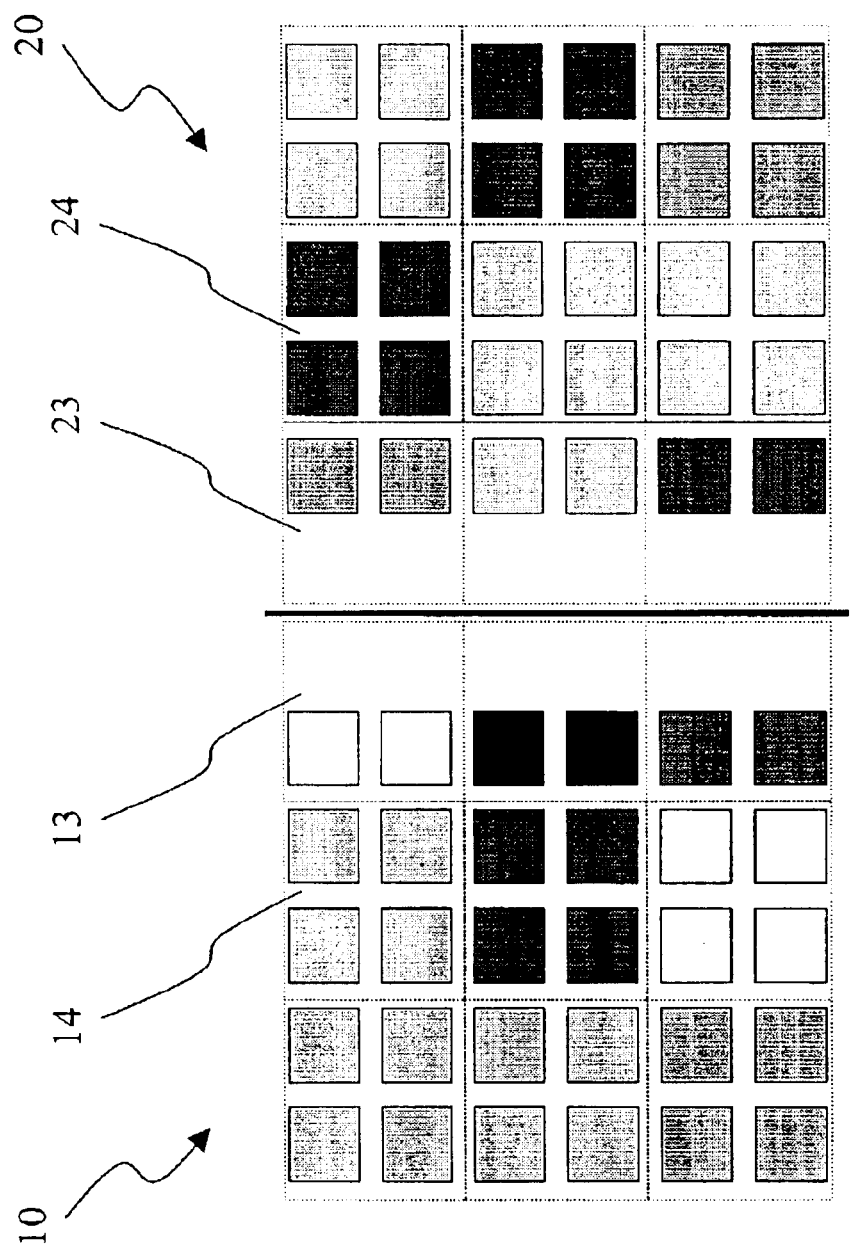
FIG. 3 is a schematic view of the redefined pixel for the composite liquid crystal panel of the invention.

Refer to FIG. 3 for redefining the pixel of the composite liquid crystal panel according to the invention. The drawing illustrates one image dot consisting of four pixels. In fact, one image dot may also consist of nine pixels, by the rule of p×p pixels for one image dot, depending on the size of the liquid crystal panel. The redefined image dot, such as image dot 13 or 23, includes pixels on the border and the adjoining pixels. The rest, such as image dots 14 and 24, each consists of four original pixels.

Figure 4:
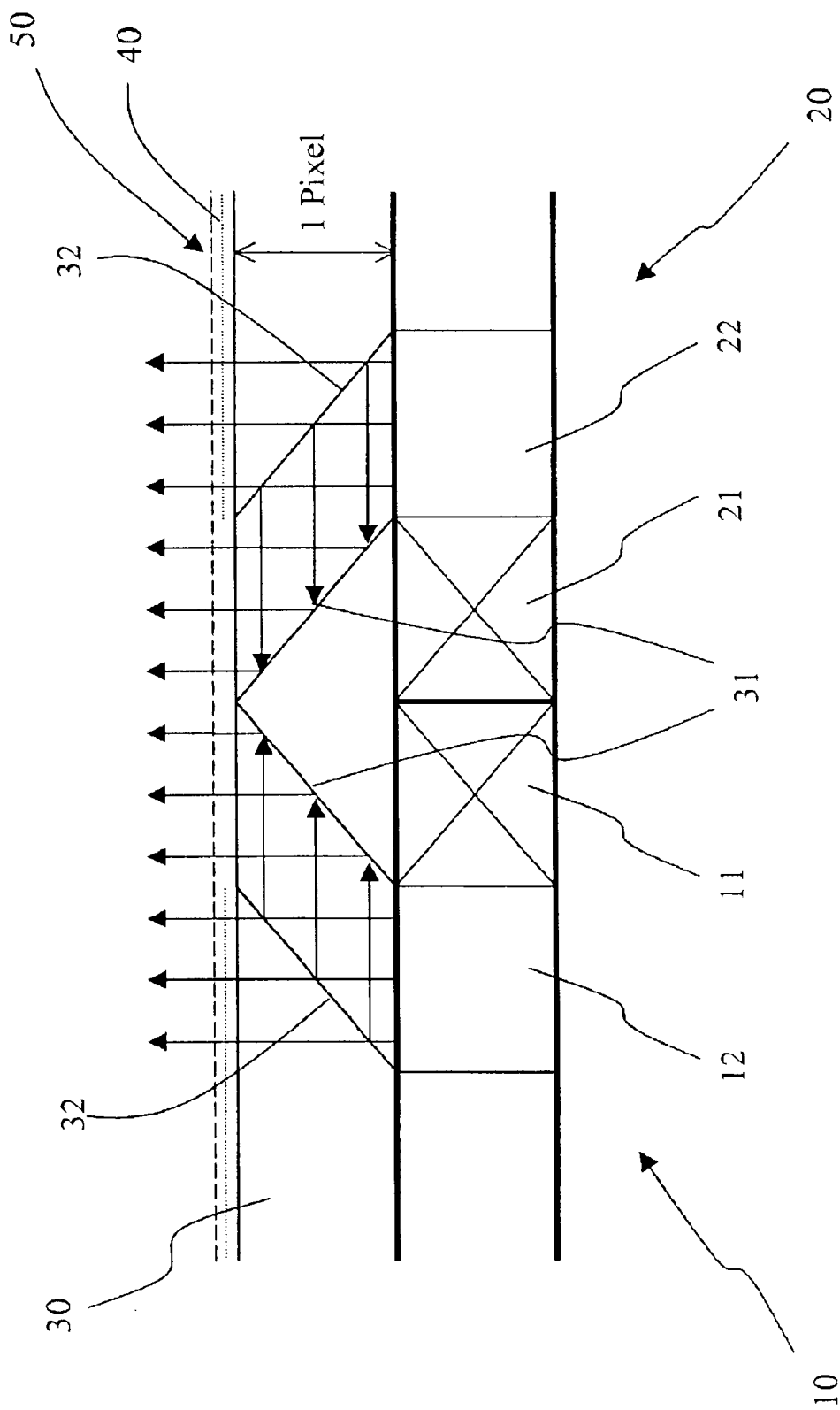
FIG. 4 is a schematic view of a second embodiment of the composite liquid crystal panel according to the invention.

Through the explanation related to FIGS. 2 and 3, the gap phenomenon on the border is eliminated by the invention. However, the problem of illumination is yet to be overcome. The previous discussion has already indicated the methods to resolve this problem. FIG. 4 illustrates two of the methods.

First, on the picture display surface above the other pixels on the panel, plate a layer of semi-reflecting film 40 to make even illumination for the whole display surface. This is the second method. In order to prevent the border from being visible on the picture display surface, a color filter 50 may be bonded to the picture display surface to completely mask the border. This is the third method.

Figure 5:
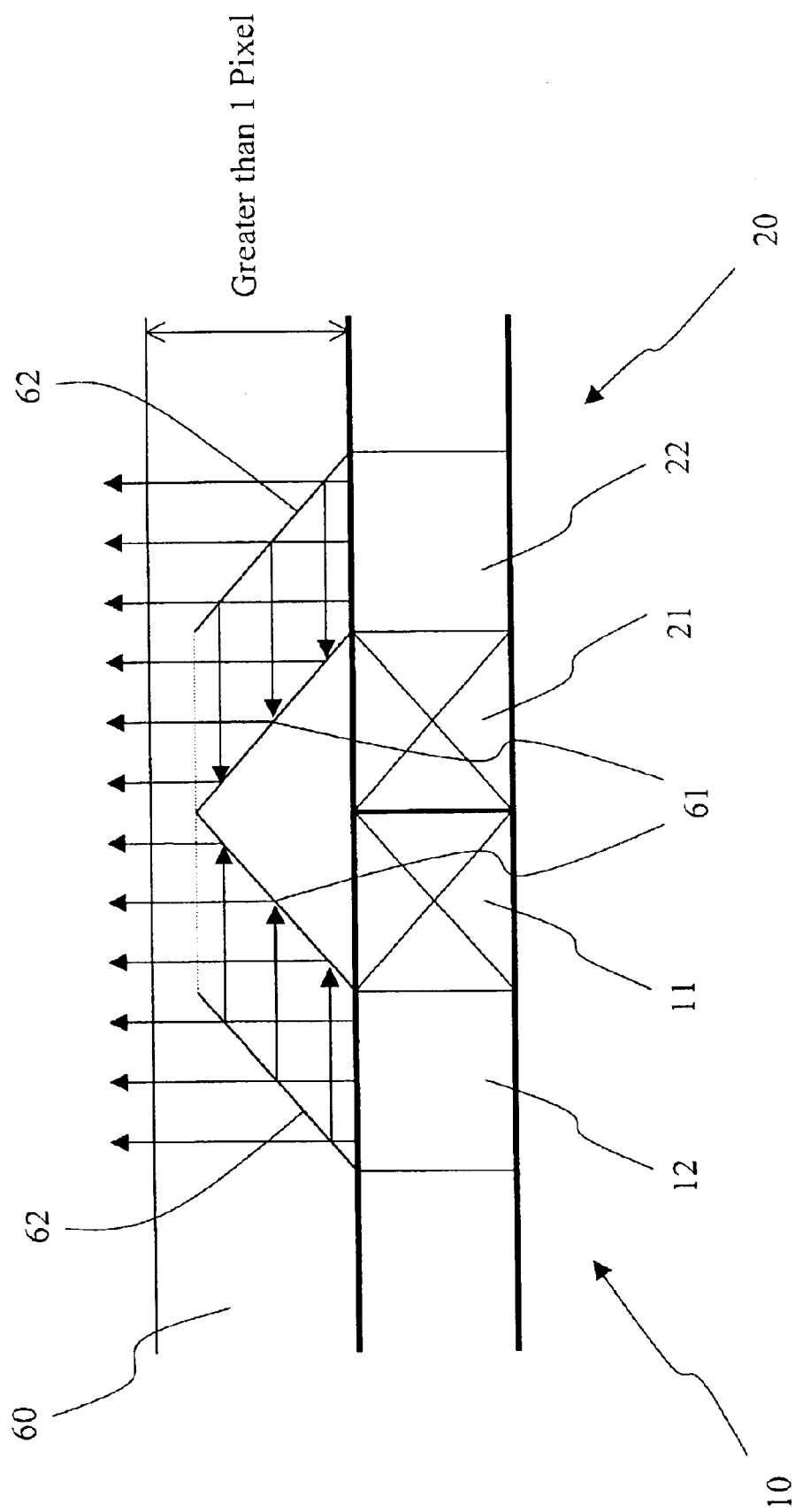
FIG. 5 is a schematic view of a third embodiment of the composite liquid crystal panel according to the invention.

Refer to FIG. 5 for a third embodiment of the invention. In this embodiment, the thickness of the picture display surface 60 is greater than one pixel. Structural elements of light distribution for the pixel are the same as the embodiment shown in FIG. 2. However, the total reflecting mirror 61 and the semi-reflecting mirror 62 do not touch the top end of the picture display surface, but remain in the picture display surface. This is the only difference. All the rest are the same as shown in FIG. 2, thus details are omitted here.

Moreover, the semi-reflecting film 40 and the color filter 50 shown in FIG. 4 may also be adopted on the embodiment shown in FIG. 5. Application of the electronic picture control module may also be adopted.

By means of the methods and constructions set forth above, a large size composite liquid crystal panel without the gap phenomenon can be made.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments that do not depart from the spirit and scope of the invention.

What is claimed is:

1. A composite liquid crystal panel, comprising:
    at least two liquid crystal display panels having respectively a border for bonding together with each other to form the composite liquid crystal panel, the border corresponding to display pixels having no light sources; and a picture display surface located above the composite liquid crystal panel to provide picture light, each of the display pixels on the liquid crystal panels corresponding to the border having at least one reflecting surface located thereabove, normal display pixels adjoining the border having at least one mirror surface located thereabove equipped with penetrative and reflective functions;

wherein the mirror surface equipped with the penetrative and reflective functions allows a portion of light coming from the normal pixels to pass through and to reach the picture display surface and another portion of light to be reflected to the reflecting surface which further reflects the light to the picture display surface.

2. The composite liquid crystal panel of claim 1, wherein the border has a width of one pixel.

3. The composite liquid crystal panel of claim 1, wherein the reflecting surface is a total reflecting surface.

4. The composite liquid crystal panel of claim 3, wherein the total reflecting surface is a high reflecting metal film.

5. The composite liquid crystal panel of claim 1 further having a semi-reflecting film plated on the picture display surface above corresponding display pixels that are outside the border and outside the pixels adjoining the border to form an even illumination for the composite liquid crystal panel.

6. The composite liquid crystal panel of claim 5 further having a color filter located on the semi-reflecting film and the picture display surface to completely mask the border.

7. The composite liquid crystal panel of claim 1, wherein the pixels on the border and the pixels adjoining the border define one image dot by p×p pixels, where p is an integer of two or more.

8. The composite liquid crystal panel of claim 7 further having an electronic picture control module to control the pixels on the border and supply light illumination for the pixels on the border a plurality of times greater than other pixels.

* * * * *